(12) United States Patent
Weston et al.

(10) Patent No.: US 12,480,779 B2
(45) Date of Patent: Nov. 25, 2025

(54) UNMANNED AERIAL VEHICLE FOR COURSE MARKING

(71) Applicant: Ford Global Technologies, LLC, Dearborn, MI (US)

(72) Inventors: Keith Weston, Canton, MI (US); Stuart C. Salter, White Lake, MI (US); Brendan Diamond, Grosse Pointe, MI (US); John Robert Van Wiemeersch, Novi, MI (US); Jonathan Hair, Northville, MI (US)

( * ) Notice: Subject to any disclaimer, the term of this patent is extended or adjusted under 35 U.S.C. 154(b) by 145 days.

(21) Appl. No.: 18/487,111

(22) Filed: Oct. 15, 2023

(65) Prior Publication Data
US 2025/0123113 A1    Apr. 17, 2025

(51) Int. Cl.
*G01C 21/36*    (2006.01)

(52) U.S. Cl.
CPC .................. *G01C 21/3661* (2013.01)

(58) Field of Classification Search
CPC ............................ G01C 21/36; G01C 21/3661
USPC .......................................................... 701/400
See application file for complete search history.

(56) References Cited

U.S. PATENT DOCUMENTS

| | | | |
|---|---|---|---|
| 9,944,392 B2 | 4/2018 | Abuelsaad et al. | |
| 10,967,972 B2 | 4/2021 | Kundu et al. | |
| 10,996,675 B1 * | 5/2021 | Yaqub | G05D 1/102 |
| 10,997,663 B1 * | 5/2021 | Wyatt | G06Q 40/08 |
| 11,006,263 B2 | 5/2021 | Ferreira et al. | |
| 11,275,371 B2 | 3/2022 | Harnett et al. | |
| 2012/0158280 A1 * | 6/2012 | Ravenscroft | G08G 5/32 |
| | | | 701/400 |
| 2014/0207365 A1 * | 7/2014 | Pereira | G08G 5/76 |
| | | | 701/400 |
| 2014/0236482 A1 * | 8/2014 | Dorum | G01C 21/3844 |
| | | | 701/400 |

(Continued)

FOREIGN PATENT DOCUMENTS

| | | | | |
|---|---|---|---|---|
| AU | 2021400336 A1 * | 6/2023 | | G01C 21/20 |
| CA | 2257258 C * | 8/2002 | | G06Q 10/02 |

(Continued)

OTHER PUBLICATIONS

Hamid Menouar, et al., UAV-Enabled Intelligent Transportation Systems for the Smart City: Applications and Challenges, IEEE Communication Magazine, Mar. 2017, pp. 22-28.

*Primary Examiner* — Atul Trivedi
(74) *Attorney, Agent, or Firm* — Emily Drake; Eversheds Sutherland (US) LLP

(57) ABSTRACT

An unmanned aerial vehicle (UAV) is disclosed. The UAV may include a UAV transceiver configured to receive course information associated with a course. The UAV may further include a UAV processor that may be configured to obtain the course information from the UAV transceiver. Responsive to obtaining the course information, the UAV processor may determine a UAV position in the course, and identify a course marker, from a plurality of course markers, in proximity to the UAV position based on the course information. The UAV processor may then determine navigation instructions associated with the course marker for a vehicle to navigate the course based on the course information. The UAV may be configured to move in proximity to a vehicle front portion and display the navigation instructions.

20 Claims, 6 Drawing Sheets

(56) References Cited

U.S. PATENT DOCUMENTS

| | | | |
|---|---|---|---|
| 2015/0226576 A1* | 8/2015 | Felix | G08G 5/55 |
| | | | 701/122 |
| 2017/0219376 A1* | 8/2017 | Padula | G01C 25/00 |
| 2018/0075759 A1 | 3/2018 | Kim et al. | |
| 2020/0271463 A1* | 8/2020 | Lear | G01C 21/343 |
| 2021/0053680 A1* | 2/2021 | Prest | G05D 1/0011 |
| 2021/0058267 A1* | 2/2021 | Prest | H04L 12/40 |
| 2021/0358315 A1* | 11/2021 | Moster | G05D 1/0094 |
| 2022/0005361 A1* | 1/2022 | de la Cruz | G05D 1/0055 |
| 2022/0035385 A1* | 2/2022 | Shetty | G05D 1/12 |
| 2022/0084416 A1* | 3/2022 | Maddanimath | G08G 5/727 |
| 2022/0121222 A1* | 4/2022 | Vernon | G08G 5/22 |
| 2022/0343767 A1* | 10/2022 | Galindo | G05D 1/101 |
| 2023/0282121 A1* | 9/2023 | Ali | G01C 21/3807 |
| | | | 701/409 |
| 2024/0133693 A1* | 4/2024 | Ali | G08G 5/55 |
| 2025/0123113 A1* | 4/2025 | Weston | G01C 21/3661 |

FOREIGN PATENT DOCUMENTS

| | | | |
|---|---|---|---|
| EP | 3968311 A1 * | 3/2022 | G08G 5/53 |
| EP | 4049877 A1 * | 8/2022 | H04N 7/181 |
| WO | WO-2019222358 A1 * | 11/2019 | G01C 21/3658 |
| WO | WO-2022221289 A2 * | 10/2022 | G06F 11/3684 |
| WO | WO-2024124061 A1 * | 6/2024 | G08G 5/54 |

\* cited by examiner

UNMANNED AERIAL VEHICLE FOR COURSE MARKING

FIELD

The present disclosure relates to an unmanned aerial vehicle (UAV) and more particularly to a UAV for course marking.

BACKGROUND

Course markings are typically required to mark waypoints in a course or a route to assist in vehicle navigation. For example, course markings are required to indicate junction/intersection points or turn points on a course. Course organizers or operators generally use different types of course markings to mark the waypoints such as ribbons, pin flags, turn signs, reflective strips, etc.

On some courses, physical course markings may not be allowed due to environmental considerations. Users typically face inconvenience while navigating their vehicles on such courses. Therefore, a system is required that may facilitate users to navigate on the courses where physical course markings may not be present.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
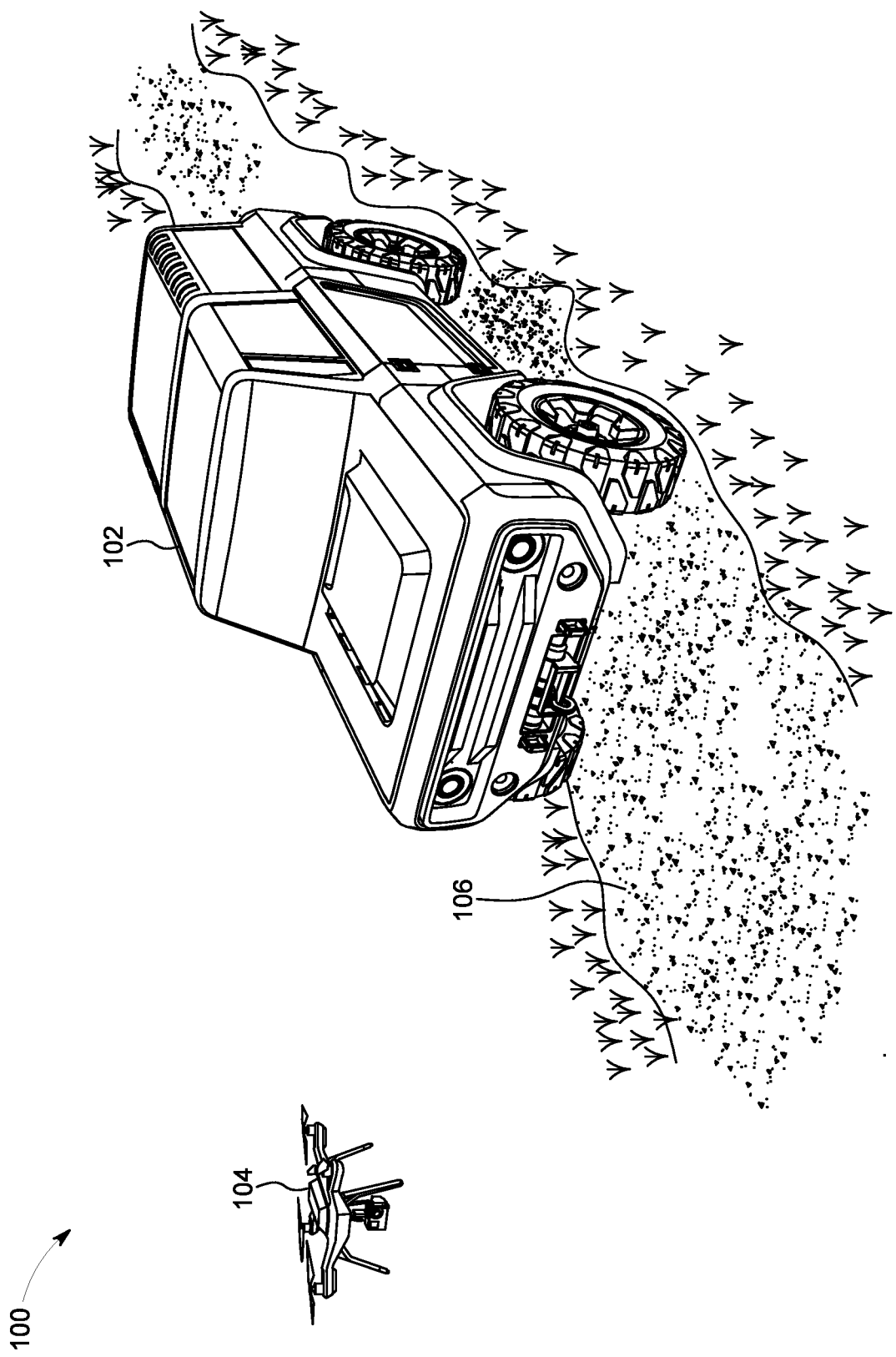
FIG. 1 depicts an example environment in which techniques and structures for providing the systems and methods disclosed herein may be implemented.

The present disclosure describes an unmanned aerial vehicle (UAV) (e.g., a drone) that may act as a course marker and may provide indications of waypoints to assist a vehicle driver in navigating a course. The UAV may be communicatively coupled to a vehicle and lead the vehicle (e.g., move in a vehicle front portion) to provide navigation instructions to the vehicle driver. To determine navigation instructions to provide to the vehicle driver, the UAV may obtain course information that may include a course map, a course route, course markers on the course route, and location and type of each course marker. Responsive to obtaining the course information, the UAV may identify a real-time UAV position in the course map, and identify a course marker (e.g., an upcoming course marker) that may be nearest to the vehicle in the course route based on the real-time UAV position and the course information. The UAV may determine the navigation instructions to provide to the vehicle driver based on the identified course marker. Responsive to determining the navigation instructions, the UAV may display the navigation instructions on a UAV display screen. Since the UAV moves in front of the vehicle, the vehicle driver may view the navigation instructions on the UAV display screen and may accordingly maneuver vehicle movement.

In some aspects, the navigation instructions displayed on the UAV display screen may be in the form of a text message and/or a sign or a symbol. In further aspects, the UAV may store a plurality of streamers/banners in a UAV compartment, and may use one or more of the streamers/banners to display the navigation instructions to the vehicle driver. Each steamer/banner may be associated with a type of a course marker. Responsive to identifying the upcoming course marker, the UAV may identify a course marker type associated with the upcoming course marker from the course information, and may accordingly select a streamer/banner to display to the vehicle driver based on the identified course marker type. The UAV may be configured to display the selected streamer/banner to the vehicle driver by physically moving the streamer/banner out of the UAV compartment.

In some aspects, the UAV may be configured to provide navigation instructions for turn points, bridge points, slow-down points, etc. on the course route to the vehicle driver. In additional aspects, the UAV may be configured to obtain inputs from a UAV in-built camera and may determine adverse situations or obstructions on the course route based on the obtained inputs. The UAV may be further configured to provide indications and/or navigation instructions to the vehicle driver based on the determined adverse situations or obstructions, so that the vehicle driver may circumvent the adverse situations or obstructions.

The present disclosure discloses a UAV that displays navigation instructions to the vehicle driver when the vehicle travels on a course. Since the UAV determines the navigation instructions based on the course information, physical course markers are not required to be placed on the course, which assists in conserving resources and protecting environment. Further, since the navigation instructions are displayed on the UAV display screen and the UAV moves in front of the vehicle, it is highly convenient for the vehicle driver to view the navigation instructions and probability of missing a course marker is greatly reduced.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and an unmanned aerial vehicle (UAV) 104 (e.g., a drone). The vehicle 102 may take the form of any passenger or commercial vehicle.

In an exemplary aspect, the vehicle 102 may be an off-road vehicle that may be travelling on a course 106 (e.g., an off-road course or route), as depicted in FIG. 1. In other aspects, the vehicle 102 may be a car, a crossover vehicle, a van, a minivan, a bus, a truck, etc. Further, the vehicle 102 may be a manually driven vehicle and/or may be configured to operate in a partially autonomous mode. Furthermore, the vehicle 102 may include any powertrain such as, for example, a gasoline engine, one or more electrically-actuated motor(s), a hybrid system, etc.

The UAV 104 may be communicatively coupled with the vehicle 102, and may be configured to lead the vehicle 102 and provide navigation instructions to the vehicle 102 (e.g., during drone operation) when the vehicle 102 travels on the course 106. Stated another way, the UAV 104 may be configured to move in proximity to a vehicle front portion and may be configured to provide navigation instructions to the vehicle 102 to complete the course 106. In some aspects, the UAV 104 may be configured to obtain vehicle's GPS location and may be configured to lead the vehicle 102 based on the vehicle's GPS location. In other aspects, the UAV 104 may include in-built UAV cameras, and may be configured to lead the vehicle 102 based on vehicle images captured by the in-built UAV cameras.

In some aspects, the UAV 104 may be housed in the vehicle 102 when the UAV 104 may not be in operation and/or when the vehicle 102 may not be travelling. Specifically, the vehicle 102 may include a housing (not shown) for the UAV 104 in which the UAV 104 may rest when the UAV 104 may not be operational. In some aspects, the housing may be present near a vehicle top or ceiling area and may include a landing pad. The UAV 104 may rest in the housing when the UAV 104 may not be in use to save power. The UAV 104 may be configured to move out of the housing and move (or "fly") in proximity to the vehicle front portion when the UAV 104 may be in operation.

When the UAV 104 may be in operation (i.e., moving in proximity to the vehicle front portion), the UAV 104 may act as a course marker and may provide indications of waypoints to assist in vehicle navigation. For example, the UAV 104 may provide indications of waypoints (e.g., the course markers) such as turn points, slow-down points, bridge points, potholes points, etc. to the vehicle 102, when the UAV 104 may be moving in proximity to the vehicle front portion. A vehicle driver/operator may view the indications provided by the UAV 104, and may accordingly maneuver vehicle movement. The UAV 104 may provide different indications for course marker types. For example, the UAV 104 may provide a different indication for a turn point as compared to an indication for a bridge point. Examples of different types of indications are depicted in FIGS. 3A-3C and 4, and described later in the description below. In additional aspects, the UAV 104 may be configured to provide indications of adverse conditions or situations when the UAV 104 identifies an adverse condition/situation on the course, e.g., based on inputs/images received from the in-built UAV cameras.

To provide indications associated with the waypoint to the vehicle 102, the UAV 104 may first obtain course information associated with the course. In some aspects, the UAV 104 may obtain the course information from the vehicle 102 or an external server that may be associated with a course organizer/operator. The course information may include, for example, a course route, a course map, a course start point, a course exit point, a list of a plurality of course markers on the course route, a course marker location associated with each course marker, and a course marker type associated with each course marker.

Responsive to obtaining the course information, the UAV 104 may determine a real-time UAV position in the course 106. In some aspects, the UAV 104 may determine the real-time UAV position in the course based on Global Positioning System (GPS) signals obtained from a UAV GPS receiver and the course map included in the course information. In other aspects, the UAV 104 may determine the real-time UAV position in the course based on a real-time vehicle geolocation that the UAV 104 may receive from the vehicle 102, and the course map included in the course information.

Responsive to determining the real-time UAV position (or UAV position) in the course, the UAV 104 may determine or identify a course marker (from the plurality of course markers) or a waypoint in proximity to the UAV position. For example, the UAV 104 may identify a course marker nearest to the UAV 104 in the direction of vehicle movement/heading. In some aspects, the UAV 104 may identify the course marker, from the plurality of course markers, based on the course information. As an example, by using the course route, the course map, the course marker locations and the UAV position, the UAV 104 may identify an upcoming or nearest course marker that the vehicle 102 may encounter in the course route.

Responsive to course marker identification, the UAV 104 may determine navigation instructions for the vehicle 102 to navigate the course based on the course marker location associated with the identified course marker. For example, the UAV 104 may provide instructions or an indication to the vehicle 102 to "turn left" when the UAV 104 determines that the upcoming course marker is a junction that may require the vehicle 102 to turn left. In some aspects, the UAV 104 may provide instructions/indications to the vehicle 102 by displaying the instructions on a UAV display screen. Since the UAV 104 moves in front of the vehicle 102 (as described above), a vehicle driver may view the instructions on the UAV display screen, and may accordingly maneuver vehicle movement. Example snapshots of displaying instructions on the UAV display screen are depicted in FIGS. 3A-3C and 4, and described later in the description below.

The vehicle 102 and the UAV 104 implement and/or perform operations, as described here in the present disclosure, in accordance with the owner manual and safety guidelines. In addition, any action taken by the vehicle driver based on recommendations or notifications provided by the vehicle 102 and the UAV 104 should comply with all the rules specific to the location and operation of the vehicle 102 and the UAV 104 (e.g., Federal, state, country, city, etc.). The recommendation or notifications, as provided by the vehicle 102 and UAV 104, should be treated as suggestions and only followed according to any rules specific to the location and operation of the vehicle 102 and the UAV 104.

Figure 2:
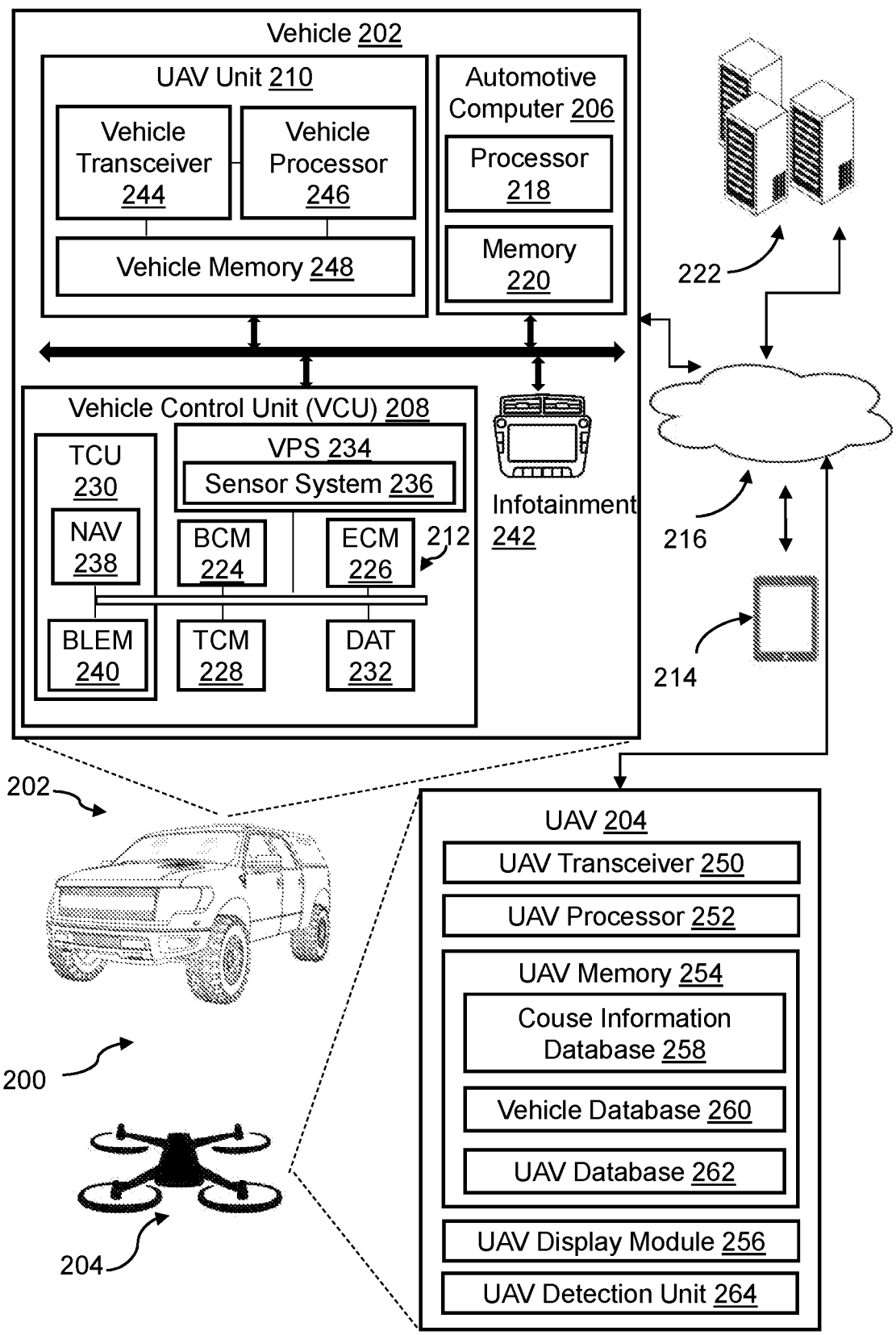
FIG. 2 depicts an example system for course marking and navigating a vehicle in accordance with the present disclosure.
Figure 3A:
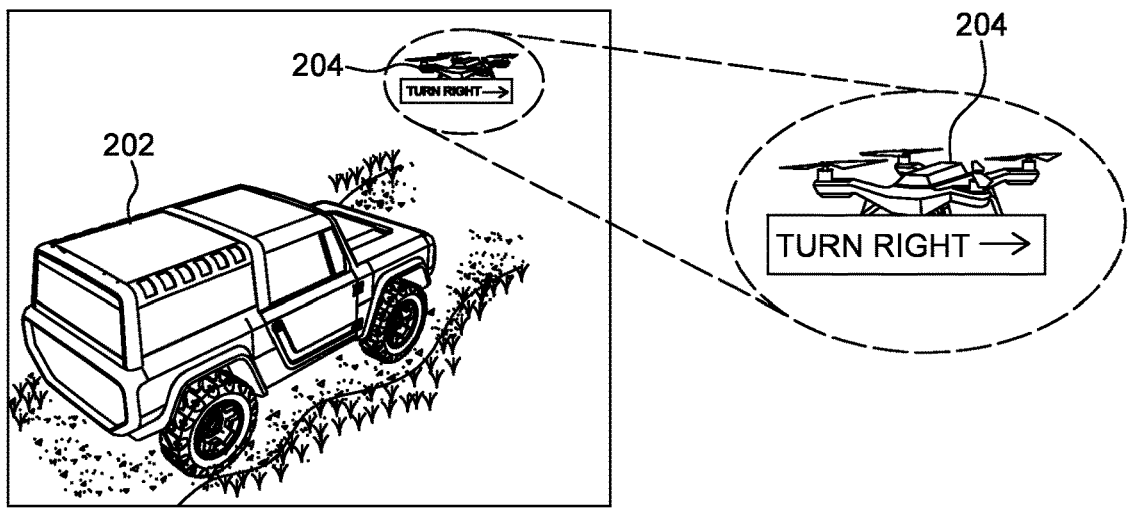
FIGS. 3A-3C depict example snapshots of an unmanned aerial vehicle (UAV) providing navigation instructions to a vehicle in accordance with the present disclosure.
Figure 3B:
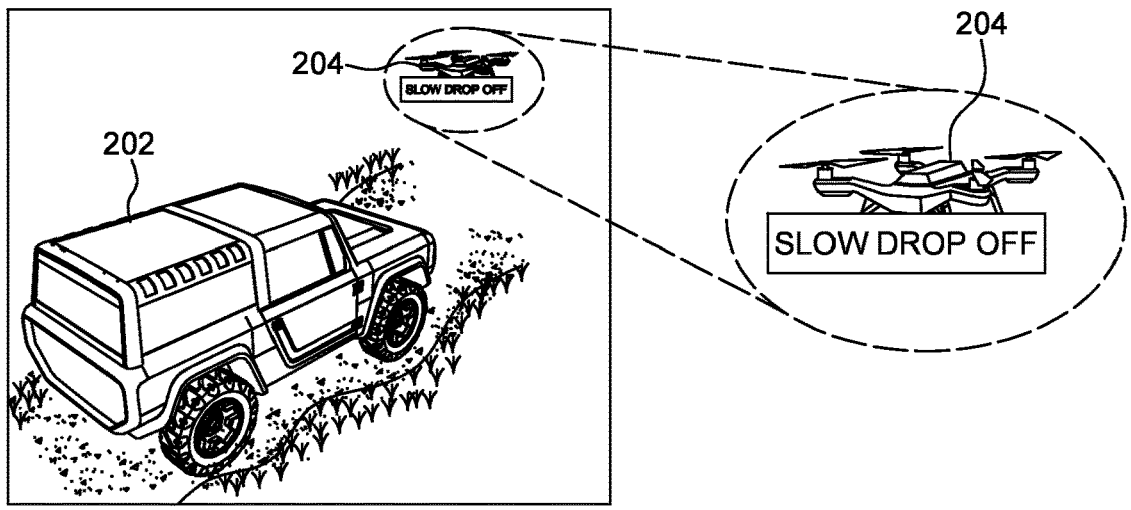
Figure 3C:
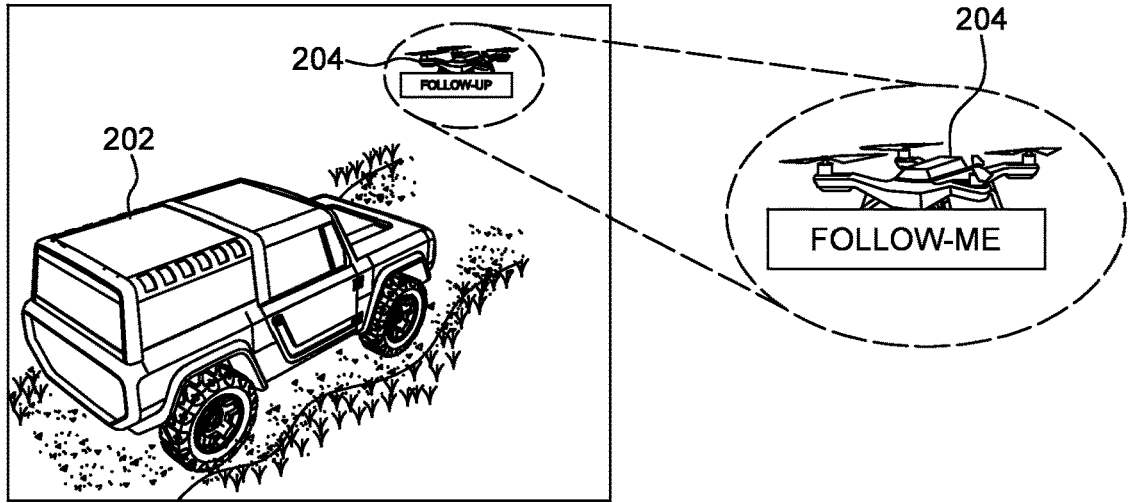
Figure 4:
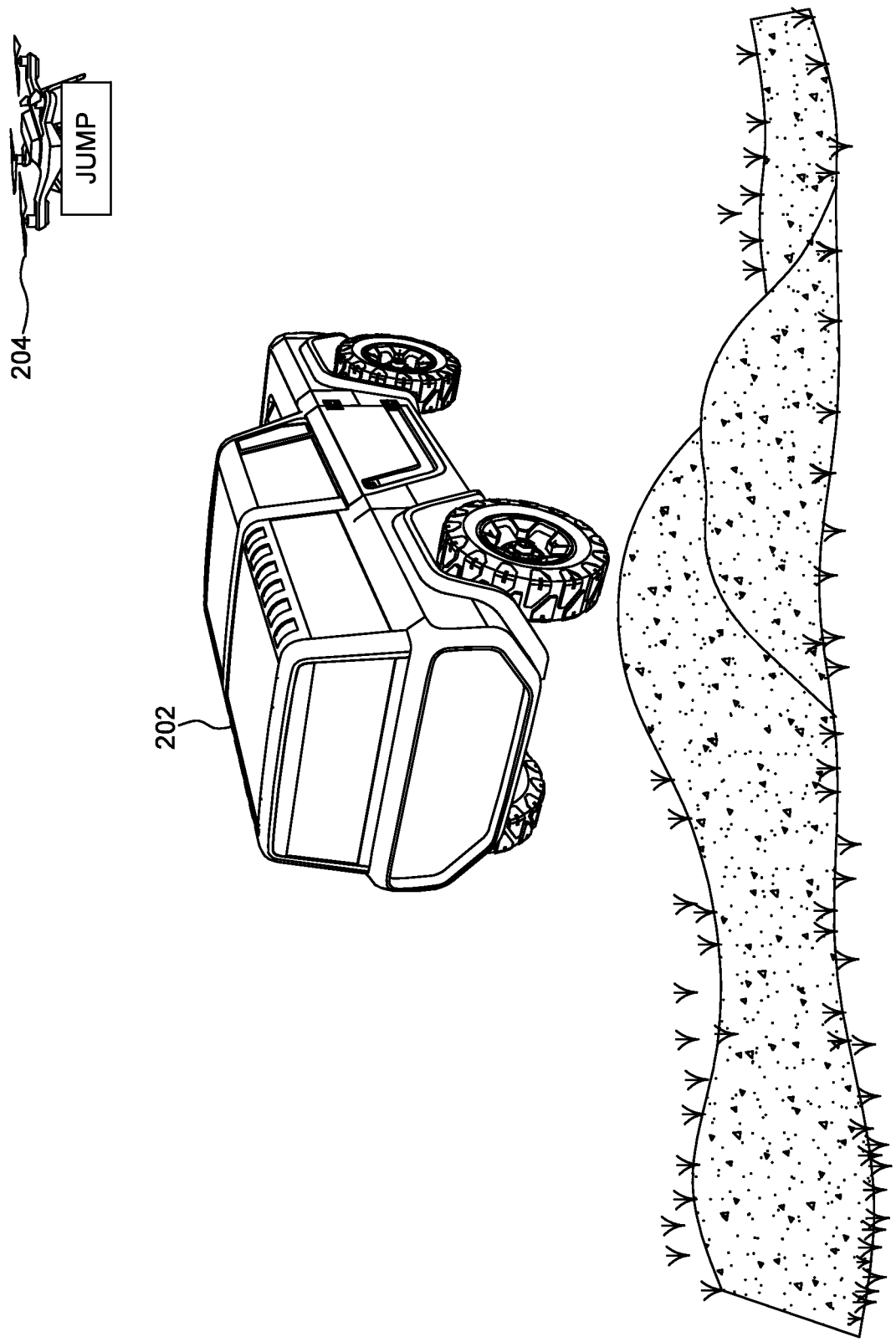
FIG. 4 depicts another example snapshot of a UAV providing navigation instructions to a vehicle in accordance with the present disclosure.

FIG. 2 depicts an example system 200 for course marking and navigating a vehicle 202 in accordance with the present disclosure. While explaining FIG. 2, references will be made to FIGS. 3A-3C and FIG. 4. FIGS. 3A-3C depict example snapshots an unmanned aerial vehicle 204 (UAV 204) providing navigation instructions to the vehicle 202. FIG. 4 depicts another example snapshot of the UAV 204 providing navigation instructions to the vehicle 202.

The system 200 may include the vehicle 202 and the UAV 204 that may be communicatively coupled with each other (e.g., via one or more network(s) 216 described below). The vehicle 202 may be same as the vehicle 102, and the UAV 204 may be same as the UAV 104. The vehicle 202 may include an automotive computer 206, a Vehicle Control Unit (VCU) 208 and a UAV unit 210. The VCU 208 may include a plurality of Electronic Control Units (ECUs) 212 disposed in communication with the automotive computer 206.

The system 200 may further include a mobile device 214 that may connect with the automotive computer 206 and/or the UAV unit 210 by using wired and/or wireless communication protocols and transceivers. In some aspects, the mobile device 214 may be associated with a vehicle driver/operator (not shown in FIG. 2). The mobile device 214 may communicatively couple with the vehicle 202 and/or the via one or more network(s) 216, which may communicate via one or more wireless connection(s), and/or may connect with the vehicle 202 directly by using near field communication (NFC) protocols, Bluetooth® protocols, Wi-Fi, Ultra-Wideband (UWB), and other possible data connection and sharing techniques. In further aspects, the mobile device 214 may communicatively couple with the UAV 204 via the one or more network(s) 216.

The network(s) 216 illustrates an example communication infrastructure in which the connected devices discussed in various embodiments of this disclosure may communicate. The network(s) 216 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 206 and/or the UAV unit 210 may be installed anywhere in the vehicle 202. The automotive computer 206 may be or include an electronic vehicle controller, having one or more processor(s) 218 and a memory 220. Moreover, the UAV unit 210 may be separate from the automotive computer 206 (as shown in FIG. 2) or may be integrated as an automotive computer part.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable medium or memory storing UAV operation program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the automotive computer 206 may be disposed in communication with one or more server(s) 222 and the mobile device 214. The server(s) 222 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In some aspects, the server 222 may be configured to store the course information described above in FIG. 1. The server 222 may further communicatively couple with the UAV 104 via the network 216. The server 222 may transmit the course information to the vehicle 202 and/or the UAV 104 via the network 216 at a predefined frequency or when the vehicle 202/UAV 204 transmit a request to the server 222 to obtain the course information.

In accordance with some aspects, the VCU 208 may share a power bus with the automotive computer 206, and may be configured and/or programmed to coordinate the data between vehicle 202 systems, connected servers (e.g., the server(s) 222), and other vehicles (not shown in FIG. 2) operating as part of a vehicle fleet. The VCU 208 can include or communicate with any combination of the ECUs 212, such as, for example, a Body Control Module (BCM) 224, an Engine Control Module (ECM) 226, a Transmission Control Module (TCM) 228, a telematics control unit (TCU) 230, a Driver Assistances Technologies (DAT) controller 232, etc. The VCU 208 may further include and/or communicate with a Vehicle Perception System (VPS) 234, having connectivity with and/or control of one or more vehicle sensory system(s) 236. The vehicle sensory system(s) 236 may include vehicle cameras, sitting area sensors, ambient temperature sensors, etc. In some aspects, the VCU 208 may control the vehicle operational aspects and implement one or more instruction sets received from an application (e.g., a drone control application) operating on the mobile device 214, the UAV 204, from one or more instruction sets stored in the memory 220, and/or instruction sets stored in the UAV unit 210.

The TCU 230 can be configured and/or programmed to provide vehicle connectivity to wireless computing systems onboard and off board the vehicle 202, and may include a Navigation (NAV) receiver 238 for receiving and processing a GPS signal, a BLE® Module (BLEM) 240 or BUN (BLE, UWB, NFC module), a Wi-Fi transceiver, a Ultra-wideband (UWB) transceiver, and/or other wireless transceivers (not shown in FIG. 2) that may be configurable for wireless communication between the vehicle 202 and other systems, computers, and modules. The TCU 230 may be disposed in communication with the ECUs 212 by way of a bus. The vehicle 202 may be configured to transmit a real-time vehicle location to the UAV 204 based on the GPS signals received by the NAV receiver 238.

The ECUs 212 may control aspects of vehicle operation and communication using inputs from human drivers, inputs from an autonomous vehicle controller, the UAV unit 210, and/or via wireless signal inputs received via the wireless connection(s) from other connected devices, such as the mobile device 214, the server(s) 222, among others.

The BCM 224 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, display system, door locks and access control, vehicle energy management, and various comfort controls. The BCM 224 may also operate as a gateway for bus and network interfaces to interact with remote ECUs (not shown in FIG. 2).

The DAT controller 232 may provide Level-1 through Level-3 automated driving and driver assistance functionality that can include, for example, active parking assistance, trailer backup assistance, adaptive cruise control, and/or driver status monitoring, among other features. In some aspects, the DAT controller 232 may assist the vehicle driver to control vehicle movement (e.g., autonomously maneuver vehicle movement) based on navigation instructions/indications (described above in conjunction with FIG. 1) that the UAV 204 may provide to the vehicle 202.

In some aspects, the automotive computer 206 may connect with an infotainment system 242 that may include a touchscreen interface portion, and may include voice recognition features, biometric identification capabilities that can identify users based on facial recognition, voice recognition, fingerprint identification, or other biological identification means. The infotainment system 242 may be further configured to audibly and/or visually output notifications/information received from external systems, e.g., the server 222, the mobile device 214 and the UAV 204. For example, the infotainment system 242 may output the navigation instructions/indications (described above in conjunction with FIG. 1) that the UAV 204 may provide to the vehicle 202.

The computing system architecture of the automotive computer 206, the VCU 208, and/or the UAV unit 210 may omit certain computing modules. It should be readily understood that the computing environment depicted in FIG. 2 is an example of a possible implementation according to the present disclosure, and thus, it should not be considered limiting or exclusive.

In accordance with some aspects, the UAV unit 210 may be executed as part of and/or integrated with the ECUs 212. The UAV unit 210 may enable efficient UAV movement in proximity to the vehicle 202. The UAV unit 210, regardless of whether it is integrated with the automotive computer 206 or the ECUs 212, or whether it operates as an independent computing system in the vehicle 202, may include a vehicle transceiver 244, a vehicle processor 246, and a vehicle memory 248, which may be communicatively coupled to each other. The vehicle processor 246 and the vehicle memory 248 may be similar to the processor 218 and the memory 220, respectively.

In some aspects, to enable UAV movement in proximity to the vehicle 202, the vehicle processor 246 may obtain user input(s) (such as user preferences for UAV flight in proximity to the vehicle 202) from the infotainment system 242 and/or the mobile device 214 (e.g., via the UAV control application installed in the mobile device 214). As an example, the user inputs may include a user preference that the UAV 204 should move between 5-8 feet in front of the vehicle 202, when the vehicle 202 travels on the course 106. Responsive to obtaining the user inputs, the vehicle processor 246 may store the obtained user inputs in the vehicle memory 248 and may additionally transmit the user inputs to the UAV 204 via the vehicle transceiver 244 and the network 216. The vehicle processor 246 may further obtain vehicle data (such as vehicle speed, vehicle direction/heading, real-time vehicle location, etc.) from the VCU 208, and may transmit the vehicle data to the UAV 204 via the vehicle transceiver 244 and the network 216. The UAV 204 may obtain the user inputs and the vehicle data from the vehicle transceiver 244, and may control UAV movement in proximity to the vehicle front portion based on the user inputs and the vehicle data.

The UAV 204 may include a plurality of components including, but not limited to, a UAV transceiver 250, a UAV processor 252, a UAV memory 254, and a UAV display module 256 which may be communicatively coupled with each other.

The UAV display module 256 may be configured to display the navigation instructions described above in conjunction with FIG. 1 to the vehicle 202 (e.g., to the vehicle driver). In some aspects, the UAV display module 256 may include e-Ink displays that may effectively transmit visual indication to the vehicle driver. As an example, the UAV display module 256 may use monochrome color like Red, Yellow, or Green to display navigation instructions, and/or activate different colors when additional indications or an "all clear" indication may be required to be displayed to the vehicle driver.

The UAV memory 254 may store programs in code and/or store data for performing various UAV operations in accordance with the present disclosure. Specifically, the UAV processor 252 may be configured and/or programmed to execute computer-executable instructions stored in the UAV memory 254 for performing various UAV functions in accordance with the present disclosure. Consequently, the UAV memory 254 may be used for storing code and/or data code and/or data for performing operations in accordance with the present disclosure.

In some aspects, the UAV processor 252 may be disposed in communication with one or more memory devices (e.g., the UAV memory 254 and/or one or more external databases (not shown in FIG. 2)). The UAV memory 254 may be similar to the memory 220 or the vehicle memory 248 described above.

In accordance with some aspects, the UAV memory 254 may include a plurality of databases configured to store a plurality of information/dataset. Examples of such databases include, but are not limited to, a course information database 258, a vehicle database 260, and a UAV database 262.

The UAV transceiver 250 may be configured to receive the course information associated with the course (e.g., the course 106). In some aspects, the UAV transceiver 250 may receive the course information from the vehicle transceiver 244 or the server 222 via the network 216. In addition, the UAV transceiver 250 may be configured to receive the vehicle data and the user inputs from the vehicle 202 (e.g., from the vehicle processor 246 via the vehicle transceiver 244). The UAV transceiver 250 may be configured to store the received data in the UAV memory 254. For example, the UAV transceiver 250 may store the course information in the course information database 258, and the vehicle data and the user inputs in the vehicle database 260.

In further aspects, the UAV 204 may include a UAV detection unit 264 which may be configured to capture information associated with a geographical area in proximity to the UAV 204. In an exemplary aspect, the UAV detection unit 264 may be in-built UAV camera and the information captured by the UAV detection unit 264 may include geographical area images/video in proximity to the UAV 204. The UAV database 262 may be configured to store the geographical area images/videos captured by the in-built UAV camera. In some aspects, the UAV processor 252 may be configured to fetch the images/videos stored in the UAV database 262, and transmit, via the UAV transceiver 250, the images/videos to the vehicle transceiver 244 for display at the infotainment system 242 and for storage in the vehicle memory 248. The UAV processor 252 may additionally transmit, via the UAV transceiver 250, the images/videos to the mobile device 214 and/or the server 222 via the network 216.

During operation, the user/vehicle driver may commence vehicle movement on the course. Before commencing the vehicle movement or during the vehicle movement, the user may provide a request to the infotainment system 242 and/or the mobile device 214, requesting the UAV 204 to launch from the housing of the vehicle 202 (described above in conjunction with FIG. 1). Responsive to obtaining the request from the user, the infotainment system 242 and/or the mobile device 214 may transmit (e.g., via the vehicle transceiver 244 when the user provides the inputs to the infotainment system 242) a command signal to the UAV 204 to launch from the housing. The vehicle transceiver 244 may additionally transmit the user inputs (or user preferences described above) and the vehicle data to the UAV 204.

The UAV transceiver 250 may receive the command signal, the user inputs and the vehicle data from the vehicle transceiver 244, and may transmit the received information to the UAV processor 252. Responsive to receiving the information described above, the UAV processor 252 may cause the UAV 204 to launch from the housing and "lead" vehicle movement (or move in proximity to the vehicle front portion) based on the user inputs and the vehicle data.

In addition, responsive to or before launching the UAV 204 from the housing, the UAV processor 252 may obtain the course information from the UAV memory 254 or directly from the vehicle 202 or the server 222 via the UAV transceiver 250. Responsive to obtaining the course information, the UAV processor 252 may determine a UAV position/location in the course map (that may be part of the course information). In an exemplary aspect, the UAV processor 252 may determine the UAV location by using GPS signals associated with the UAV 204 received by a UAV GPS receiver (not shown), and may correlate the UAV location with the course map to determine the UAV position/location in the course map. In other aspects, then UAV processor 252 may determine the UAV position/location by using the real-time vehicle location (that may be part of the vehicle data obtained from the vehicle 202), and may correlate the real-time vehicle location with the course map to determine the UAV position/location in the course map.

Responsive to determining the UAV position/location in the course map, the UAV processor 252 may identify a course marker or a waypoint (e.g., an upcoming course marker or a nearest course marker in the course route) from the plurality of course markers in proximity to the determined UAV position. In some aspects, the UAV processor 252 may identify the course marker based on the course information and the information associated with vehicle heading that may be part of the vehicle data. Responsive to identifying the course marker, the UAV processor 252 may determine a location of the course marker in the course map (i.e., "course marker location") and a course marker type based on the course information. For example, the UAV processor 252 may determine if the identified course marker is a junction point or a bridge point as the course marker type.

Responsive to determining the course marker location and course marker type, the UAV processor 252 may determine or generate navigation instructions for the vehicle 202 to navigate the course based on the course information (e.g., course marker location and course marker type). As an example, the UAV processor 252 may determine or generate navigation instructions for the vehicle 202 to "turn right" when the UAV processor 252 determines that the identified course marker may be a junction point that requires the vehicle 202 to turn right and the identified course marker may be within a predefined distance range ahead of the vehicle 202 (e.g., 100-150 feet ahead).

Responsive to determining the navigation instructions, the UAV processor 252 may cause the UAV display module 256 to display/provide (as a written message or visual signal) the navigation instructions "TURN RIGHT" for the vehicle driver, as depicted in FIG. 3A. The vehicle driver may view the visual message/indication and may take an appropriate action based on the displayed navigation instruction.

In some aspects, the UAV processor 252 may determine the navigation instructions based on a mapping of the plurality of course markers and a plurality of navigation instructions that may be pre-stored in the UAV memory 254. In this case, the UAV processor 252 may fetch the mapping from the UAV memory 254, and determine an appropriate navigation instruction to be displayed/provided to the vehicle 202 based on the determined course marker type and the mapping.

As described above, the UAV processor 252 may display the navigation instructions on the UAV display module 256. For example, the UAV processor 252 may transmit instructions to the UAV display module 256 to display the written message "TURN RIGHT" or display any symbol to provide indication to "TURN RIGHT" to the vehicle 202/vehicle driver. In some aspects, the UAV processor 252 may additionally transmit, via the UAV transceiver 250, the navigation instructions to the vehicle transceiver 244 to display/audibly output the navigation instructions on the infotainment system 242. In further aspects, the UAV processor 252 may transmit, via the UAV transceiver 250, the navigation instructions to the DAT controller 232, which may assist the vehicle driver to navigate the course based on the received navigation instructions.

In additional aspects, the UAV 204 may include or store a plurality of streamers or banners that may be used by the UAV processor 252 to provide information associated with the identified course marker (e.g., the course marker type) and/or the navigation instructions to the vehicle 202/vehicle driver. The UAV processor 252 may cause the UAV 204 to select a streamer/banner from the plurality of streamers/banners stored in a compartment (that may be located in a UAV bottom portion) associated with the UAV 204 based on the identified course marker (e.g., course marker type), and display the selected streamer/banner to the vehicle 202/vehicle driver to provide/display the navigation instructions and/or the course marker type. For example, the UAV processor 252 may cause the UAV 204 to lower the selected streamer/banner from the UAV bottom portion so that the vehicle 202/vehicle driver may view the navigation instructions conveniently. In some aspects, the streamer/banner may include a specific printed message such as "TURN RIGHT". In other aspects, the streamer/banner may include a specific color that indicates the navigation instructions. In some aspects, the UAV database 262 may include a mapping of the navigation instructions and banner colors, and the UAV processor 252 may select the banner color or the banner to display based on the determined navigation instructions.

In further aspects, the UAV 204 may include lighting elements that may be configured to provide visual indication to the vehicle driver based on the determined navigation instructions.

Although the description above describes an aspect where the UAV display module 256 displays the navigation message "TURN RIGHT", the present disclosure is not limited to such a message. In a similar manner as described above, the UAV processor 252 may display other navigation instructions including, but not limited to, "SLOW DROP OFF" (as depicted in FIG. 3B), "FOLLOW-ME" (as depicted in FIG. 3C), etc., based on the course marker location and the course marker type associated with the identified course marker. As another example, when the UAV processor 252 determine that the course marker type may be a bridge point (or a bumpy point), the UAV processor 252 may cause the UAV display module 256 to display a message "JUMP", as depicted in FIG. 4.

In further aspects, the UAV processor 252 may be configured to determine one or more adverse situations in the course route and indicate information associated with the adverse situations to the vehicle 202/vehicle driver via the UAV display module 256 (or the streamer/banner). In this case, the UAV processor 252 may obtain inputs (i.e., images/videos) captured by the UAV in-built camera and determine the adverse situations based on the obtained inputs. In some aspects, responsive to obtaining to inputs from the UAV in-built camera, the UAV processor 252 may be configured to determine if there exists an adverse situation (e.g., a vehicle stuck in a pothole) on the course route where the vehicle 202 may be travelling. When the UAV processor 252 determines the presence of the adverse situation, the UAV processor 252 may cause the UAV 204 to hover in proximity to the adverse situation (e.g., on the vehicle that may be stuck in the pothole) and/or display an image of the adverse situation on the UAV display module 256 to indicate the adverse situation to the vehicle 202/vehicle driver. Similarly, the UAV processor 252 may determine blind spots on the course route based on the inputs obtained from the UAV in-built camera, and may determine and output navigation instructions/notifications on the UAV display module 256 based on determination of blind spots.

In further aspects, the UAV processor 252 may be configured to determine presence of an obstruction (such as another vehicle, a person, an object, or wildlife) in proximity to the vehicle 202 and output information associated with the obstruction presence for the vehicle 202/vehicle driver. In this case, the UAV processor 252 may detect the obstruction presence based on the images/videos obtained from the UAV in-built camera and may transmit information associated with the obstruction presence to the vehicle 202/vehicle driver to indicate presence of such obstruction in proximity to the vehicle 202. The UAV processor 252 may further output the information associated with the obstruction presence on the UAV display module 256. Furthermore, in this case, the UAV processor 252 may determine and output the navigation instructions for the vehicle 202/vehicle driver to navigate the course based on the obstruction presence detection.

In addition to detecting obstructions (e.g., another vehicle) in proximity to the vehicle 202, the UAV processor 252 may cause the UAV 204 to identify unauthorized vehicles in the course 106 and follow the unauthorized vehicles. The UAV processor 252 and/or the UAV 204 may further notify third-party entities (such as course organizers/operators) about the presence of unauthorized vehicles in the course 106. Further, the UAV processor 252 may provide instructions to the unauthorized vehicles to leave the course/premises by displaying such instructions on the UAV display module 256.

In additional aspects, the UAV processor 252 may cause the UAV 204 to land on the vehicle 202 when no other vehicle may be present in proximity to the vehicle 202 (e.g., to save energy). When a vehicle may be detected in proximity to the vehicle 202, the UAV processor 252 may cause the UAV 204 to take off again. In further aspects, the UAV processor 252 may be configured to display the navigation instructions to other vehicles in proximity to the vehicle 202, and mark the courses for other vehicles as well.

In further aspects, the UAV processor 252 may be configured to predict vehicle movement based on the vehicle data. Responsive to predicting the vehicle movement, the UAV processor 252 may be configured to control the UAV movement such that the UAV 204 always leads the vehicle 202 (i.e., stays in proximity to the vehicle front portion). In additional aspects, the UAV processor 252 may control the UAV movement based on the user inputs (e.g., user preferences).

In some aspects, the UAV 204 may include UAV batteries to perform operations described above. In some aspects, the course 106 may include charging pads (not shown) that may be used by the UAV 204 to charge its batteries so that the UAV 204 may have enough power to operate in the course 106. In further aspects, the UAV 204 may charge the UAV batteries by drawing power from the vehicle 202 (e.g., the UAV 204 may land on the vehicle 202, e.g., in the UAV housing, and may charge itself by using vehicle power supply). In additional aspects, the course 106 may include specific locations where the UAV 204 may land and swap/replace the UAV batteries. In addition, the UAV 204 may replace the UAV batteries with spare batteries disposed in the vehicle 202. In further aspects, the UAV 204 may also receive power from the vehicle 202 by using a tether connection unit (not shown).

Figure 5:
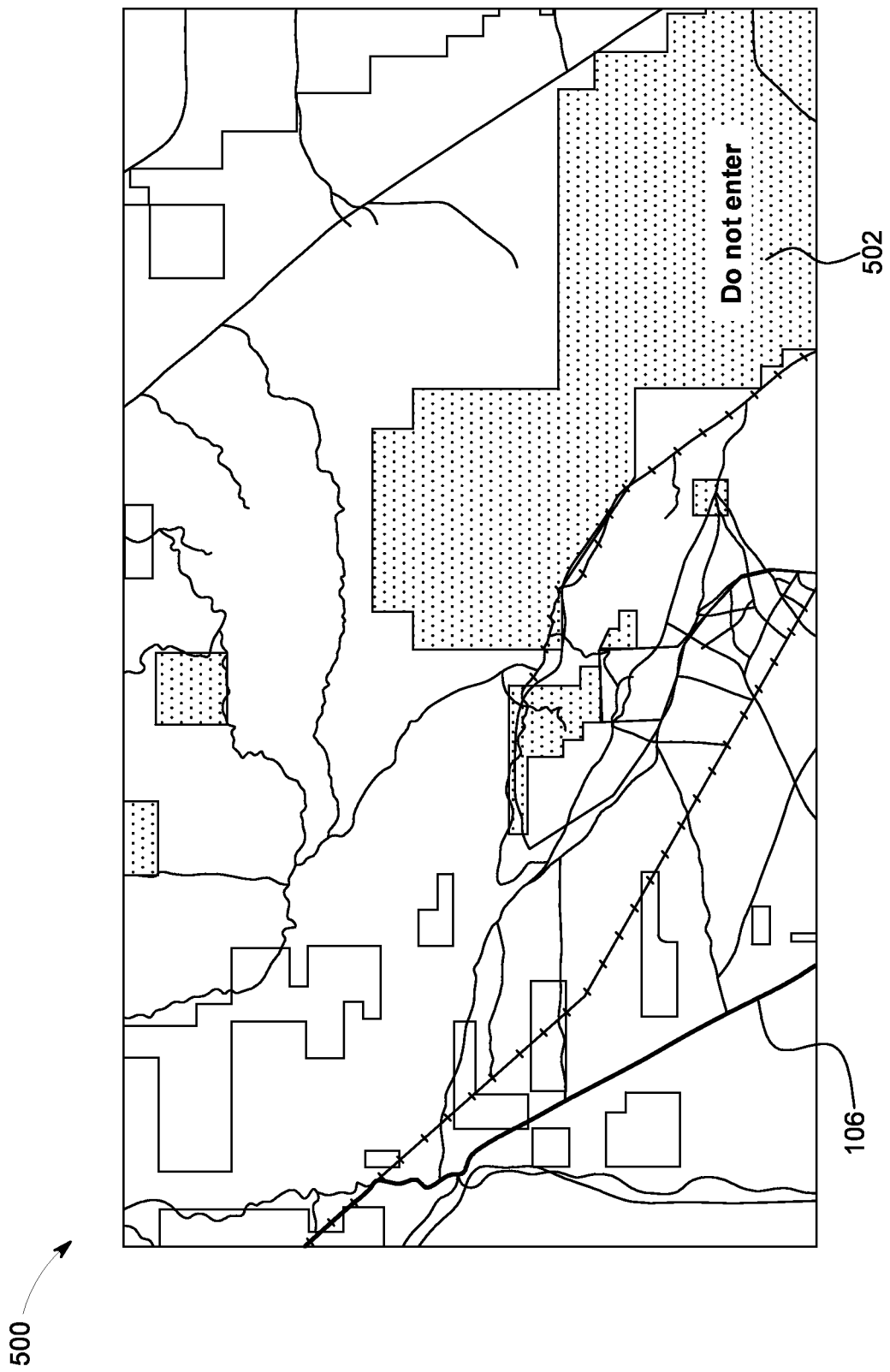
FIG. 5 depicts an example course map of a geographical area illustrating off-limit zones in a course in accordance with the present disclosure.

FIG. 5 depicts an example course map 500 of a geographical area illustrating off-limit zones/areas in a course in accordance with the present disclosure. In some aspects, the UAV processor 252 may be configured to obtain the course information which may include the course map 500. The course map 500 may include information about off-limit areas (e.g., private areas or areas where vehicle entry or UAV entry may not be allowed, shown as off-limit area 502 in FIG. 5).

Responsive to obtaining the course information, the UAV processor 252 may identify the off-limit areas 502 based on the course information. Stated another way, the UAV processor 252 may extract information associated with the off-limit areas 502 from the course information. The UAV processor 252 may be configured to determine and output the navigation instructions for the vehicle 202/vehicle driver to navigate the course 106 based on the identification of the off-limit areas 502, so that the vehicle 202 may not enter such zones/areas. For example, the UAV 204 may display "OFF-LIMIT AREA AHEAD, TURN LEFT".

In further aspects, the UAV 204 may be used in military application to provide navigation instructions to personnel such as soldiers. In such cases, the UAV 204 may lead the soldiers and display the navigation instructions. In some aspects, the UAV processor 252 may be configured to obtain route information associated with a route that the soldiers may take, and determine a UAV position in the route. The UAV processor 252 may be further configured to identify waypoints In additional aspects, the UAV 204 may be used as a Cellular or WiFi or Bluetooth repeater to help enhance radio frequency communications among off-road participants or broadcast teams.

Figure 6:
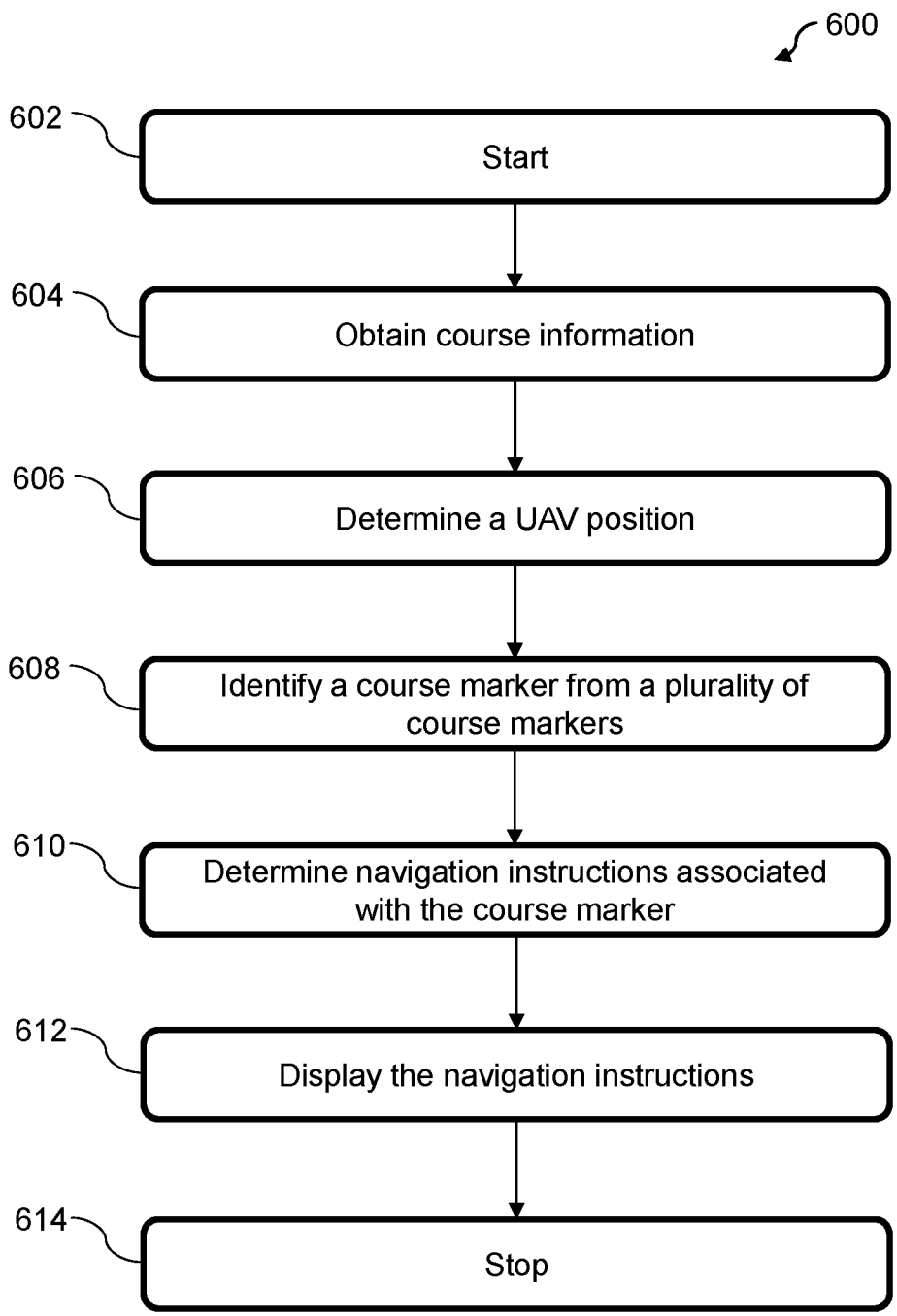
FIG. 6 depicts a flow diagram of example method for course marking and navigating a vehicle in accordance with the present disclosure.

FIG. 6 depicts a flow diagram of example method 600 for course marking and navigating a vehicle in accordance with the present disclosure. FIG. 6 may be described with continued reference to prior figures, including FIGS. 1-5. The following process is exemplary and not confined to the steps described hereafter. Moreover, alternative embodiments may include more or less steps than are shown or described herein and may include these steps in a different order than the order described in the following example embodiments.

At step 602, the method 600 may commence. At step 604, the method 600 may include obtaining, by the UAV processor 252, the course information associated with the course 106. The UAV processor 252 may obtain the course information from the vehicle 202 or the server 222. As described above, the course information may include the course route, the course map, the course start point, the course exit point, the list of the plurality of course markers on the course route, a course marker location associated with each course marker, and a course marker type associated with each course marker.

At step 606, the method 600 may include determining, by the UAV processor 252, a UAV position responsive to obtaining the course information. Specifically, the UAV processor 252 may determine the UAV position in the course map. At step 608, the method 600 may include identifying, by the UAV processor 252, a course marker from a plurality of course markers which is in proximity to the UAV position. In some aspects, the UAV processor 252 may identify the course marker based on the course information.

At step 610, the method 600 may include determining, by the UAV processor 252, the navigation instructions, associated with the identified course marker, for the vehicle 202 to navigate the course 106. In some aspects, the UAV processor 252 may determine the navigation instruction based on the course information. At step 612, the method 600 may include displaying, by the UAV processor 252, the navigation instructions.

The method 600 may end at step 614.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An unmanned aerial vehicle (UAV) comprising:
a UAV transceiver configured to receive course information associated with a course;
a display module;
a UAV processor communicatively coupled with the UAV transceiver, wherein the UAV processor is configured to:
obtain the course information from the UAV transceiver;
determine a UAV position in the course based on the course information;
identify a course marker, from a plurality of course markers, in proximity to the UAV position based on the course information;
determine navigation instructions associated with the course marker for a vehicle to navigate the course based on the course information, wherein the UAV is communicatively coupled to the vehicle, and wherein the UAV is configured to move in proximity to a vehicle front portion; and
display the navigation instructions on the display module of the UAV for observing by a driver of the vehicle.

2. The UAV of claim 1, wherein the course information comprises one or more of a course route, a course map, a course start point, a course exit point, a list of the plurality of course markers on the course route, a course marker location associated with each course marker of the plurality of course markers, or a course marker type associated with each course marker of the plurality of course markers.

3. The UAV of claim 1, wherein the plurality of course markers comprise waypoints associated with the course, and wherein the waypoints comprise at least one of turn-points, slow-down points, bridge points, or pothole points.

4. The UAV of claim 1, wherein the UAV display module comprises e-Ink displays.

5. The UAV of claim 1 further comprising at least one of a plurality of banners or a plurality of streamers stored in a compartment of the UAV, wherein the at least one of the plurality of banners or the plurality of streamers indicates the navigation instructions.

6. The UAV of claim 5, wherein the UAV processor is further configured to:
select one of a banner or a streamer from the plurality of streamers, associated with the course marker;
move the selected one of the banner or the streamer out of the compartment; and
display the navigation instructions by lowering the selected one of the banner or the streamer from a UAV bottom portion.

7. The UAV of claim 6, wherein selecting the one of the banner or the streamer from the plurality of streamers comprises:
determining a color based on a mapping of the navigation instructions to a plurality of colors; and
displaying the one of the banner or the streamer that matches the the color.

8. The UAV of claim 1, wherein the UAV processor is further configured to:
identify off-limit areas in the course based on the course information;
determine the navigation instructions for the vehicle to navigate the course based on the identification of the off-limit areas; and
display the navigation instructions.

9. The UAV of claim 1, further comprising a detection unit configured to capture information associated with a geographical area in proximity to the UAV.

10. The UAV of claim 9, wherein the detection unit comprises a camera, and wherein the information associated with the geographical area comprises geographical area images.

11. The UAV of claim 9, wherein the UAV processor is configured to:
obtain inputs from the detection unit;
detect an obstruction in proximity to the vehicle based on the inputs; and
determine the navigation instructions for the vehicle to navigate the course based on the determination of the obstruction.

12. The UAV of claim 1, wherein the course information comprises a mapping of the plurality of course markers with a plurality of navigations instructions, and wherein the UAV processor is configured to determine the navigation instructions for the vehicle to navigate the course based on the mapping.

13. A method for course marking by an unmanned aerial vehicle (UAV) comprising:
obtaining, by a processor, course information associated with a course;
determining, by the processor, a UAV position in the course based on the course information;
identifying, by the processor, a course marker, from a plurality of course markers, in proximity to the UAV position based on the course information;
determining, by the processor, navigation instructions associated with the course marker for a vehicle to navigate the course based on the course information, wherein the UAV is communicatively coupled to the vehicle, and wherein the UAV is configured to move in proximity to a vehicle front portion; and
displaying, by the processor, the navigation instructions on a display module of the UAV.

14. The method of claim 13, wherein the course information comprises one or more of a course route, a course map, a course start point, a course exit point, a list of the plurality of course markers on the course route, a course marker location associated with each course marker of the plurality of course markers, or a course marker type associated with each course marker of the plurality of course markers.

15. The method of claim 13, wherein the plurality of course markers comprises waypoints associated with the course, and wherein the waypoints comprise at least one of turn-points, slow-down points, bridge points, or pothole points.

16. The method of claim 13 further comprising:
selecting a streamer, from a plurality of streamers, associated with the course marker, wherein the plurality of streamers indicates information associated with respective course markers; and
displaying the navigation instructions based on the selection, wherein displaying the navigation instructions comprises displaying the selected streamer from a UAV bottom portion.

17. The method of claim 13 further comprising:
identifying off-limit areas based on the course information;
determining the navigation instructions for the vehicle to navigate the course based on the identification of the off-limit areas; and
displaying the navigation instructions.

18. The method of claim 13 further comprising:
obtaining inputs from a detection unit;
detecting an obstruction in proximity to the vehicle based on the inputs; and
determining the navigation instructions for the vehicle to navigate the course based on the determination of the obstruction.

19. A non-transitory computer-readable medium storing computer-executable instructions which when executed by one or more processors result in performing operations comprising:
obtaining course information associated with a course;
determining an unmanned aerial vehicle (UAV) position of a UAV in the course based on the course information;
identifying a course marker, from a plurality of course markers, in proximity to the UAV position based on the course information;
determining navigation instructions associated with the course marker for a vehicle to navigate the course based on the course information, wherein the UAV is communicatively coupled to the vehicle, and wherein the UAV is configured to move in proximity to a vehicle front portion; and displaying the navigation instructions on a display module of the UAV.

20. The non-transitory computer-readable medium of claim 19, wherein the course information comprises one or more of a course route, a course map, a course start point, a course exit point, a list of the plurality of course markers on the course route, a course marker location associated with each course marker of the plurality of course markers, or a course marker type associated with each course marker of the plurality of course markers.

* * * * *